US005646130A

United States Patent [19]
Shi

[11] Patent Number: 5,646,130
[45] Date of Patent: Jul. 8, 1997

[54] LOW MOLECULAR WEIGHT SULFATED POLYSACCHARIDES AND USES THEREOF

[75] Inventor: Guan Hua Shi, Oingdao, China

[73] Assignee: Ocean University of Oingdao, Oingdao, China

[21] Appl. No.: 498,013

[22] Filed: Jun. 30, 1995

[51] Int. Cl.$^6$ .......................... A61K 31/715; C07H 1/00; C07H 1/08

[52] U.S. Cl. ..................... 514/54; 514/821; 514/822; 514/824; 514/885; 536/123; 536/123.1; 536/124; 536/128

[58] Field of Search ..................... 514/54, 821, 822, 514/824, 885; 536/123, 123.1, 124

[56] References Cited

U.S. PATENT DOCUMENTS

| | | | |
|---|---|---|---|
| 4,044,126 | 8/1977 | Cook et al. | 424/243 |
| 4,364,923 | 12/1982 | Cook et al. | 424/46 |
| 4,414,209 | 11/1983 | Cook et al. | 424/243 |
| 4,522,811 | 6/1985 | Eppstein et al. | 514/2 |
| 4,607,025 | 8/1986 | Petitou et al. | 514/53 |
| 4,686,288 | 8/1987 | Lormeau et al. | 536/21 |
| 4,774,231 | 9/1988 | Petitou et al. | 514/53 |
| 4,777,161 | 10/1988 | Lormeau et al. | 514/56 |
| 4,801,583 | 1/1989 | Petitou et al. | 514/54 |
| 4,826,827 | 5/1989 | Lormeau et al. | 514/56 |
| 4,841,041 | 6/1989 | van Boeckel et al. | 536/118 |
| 4,943,630 | 7/1990 | Jacquinet et al. | 536/123 |
| 4,987,223 | 1/1991 | Choay et al. | 536/17.7 |
| 5,013,724 | 5/1991 | Petitou et al. | 514/54 |
| 5,017,565 | 5/1991 | Lange, III et al. | 514/54 |
| 5,019,649 | 5/1991 | Lormeau et al. | 536/21 |
| 5,034,520 | 7/1991 | Lormeau et al. | 536/127 |
| 5,063,210 | 11/1991 | Lange, III et al. | 514/54 |
| 5,173,408 | 12/1992 | Lange, III et al. | 435/69.1 |
| 5,352,601 | 10/1994 | Lange, III et al. | 435/196 |
| 5,378,829 | 1/1995 | Petitou et al. | 536/118 |
| 5,382,570 | 1/1995 | Petitou et al. | 514/53 |
| 5,424,311 | 6/1995 | Billhardt-Troughton et al. | 514/248 |
| 5,429,821 | 7/1995 | Dorian et al. | 424/424 |
| 5,430,022 | 7/1995 | Hemmi et al. | 514/18 |
| 5,439,887 | 8/1995 | Hamon et al. | 514/13 |
| 5,446,207 | 8/1995 | Pomponi et al. | 568/633 |

FOREIGN PATENT DOCUMENTS

| | | |
|---|---|---|
| 8938856 | 1/1990 | Australia . |
| 9460524 | 10/1994 | Australia . |
| 1313867 | 2/1993 | Canada . |
| 2622450 | 11/1987 | France . |
| 9323059 | 11/1993 | WIPO . |

OTHER PUBLICATIONS

Ames, "The Detection of Chemical Mutagens with Enteric Bacteria," *Chemical Mutagens, Principles and Methods for their detection*, vol. 1, Plenum Press, New York, pp. 267–282 (1971).

Ames, et al., "Methods for detecting carcinogens and mutagens with the *Salmonella*/mammalian–microsome mutagenicity test," *Mutation Res.* 31:347–364 (1975).

Ames, et al., "An improved bacterial test system for the detection and classification of mutagens and carcinogens," *Proc. Natl. Acad. Sci. U.S.A.* 70:782–786 (1973).

Andrieux, et al., "Amino Acid Sequences in Fibrinogen Mediating Its Interaction with Its Platelet Receptor, GPI-IBIIIa*," *J. Biol. Chem.* 264(16):9258–9265 (1989).

Bossant, et al., "Bioassay of paf–Acether by Rabbit Platelet Aggregation," *Methods in Enzymology* 187:125–130 (1990).

Dialog Abstract 115223045, citing: Chen, et al., "The effects of propylene glycol mannitase sulfate (PGMS) on platelet aggregation and thrombosis in rats and rabbits," *Zhongguo Haiyang Yaowu* 9(4):4–6 (1990).

Dialog Abstract 119000603, citing: Chen, et al., "Effects of propylene glycol mannate sulfate (PGMs) on high–density lipoprotein (HDL) and its subcomponents in quails," *Zhongguo Haiyang Yaowu* 12(4):8–12 (1993).

Dialog Abstract 120235716, citing: Chen, et al., "Effects of propylene glycol mannose sulfate (PGMS) on blood platelet adhesion and aggregation," *Zhongguo Yaoxue Zazhi* 28(2):78–80 (1993).

Fenton, "Thrombin Interactions with Hirudin," *Seminars in Thrombosis and Hemostasis* 15(3):265–268 (1989).

Gan, et al., "Echistatin. A Potent Platelet Aggregation Inhibitor from the Venom of the Viper," *Echis carinatus, J. Biol. Chem.* 263(36):19827–19832 (1988).

Dialog Abstract 122096100, citing: Gao, et al., "Protective effects of PGMS on experimental endothelial cell injury," *Shandong Yike Daxue Xuebao* 32(3):181–3 (1994).

Glusa, "Hirudin and Platelets," *Seminars in Thrombosis and Hemostasis* 17(2):122–125 (1991).

Dialog Abstract citing: CN 1042360 (May 23, 1990) Guan.

Dialog Abstract citing: CN 1042361 (May 23, 1990) Guan.

Henson, "Bioassay of Platelet–Activating Factor by Release of [$^3$H]Serotonin," *Methods in Enzymology* 187:130–134 (1990).

Dialog Abstract 119020191, citing: Jiang, et al., "Antithrombotic effect and the mechanism of propylene glycol mannitas sulfate," *Zhongguo Yaolixue Tongbao*, 8(6):444–447 (1992).

(List continued on next page.)

*Primary Examiner*—John Kight
*Assistant Examiner*—Howard C. Lee
*Attorney, Agent, or Firm*—Stephanie Seidman; Brown Martin Haller & McClain

[57] ABSTRACT

An oligosaccharide containing about 20 monosaccharide units is provided. This oligosaccharide designated $(M_9G)_2$ is a copolymer β-D-(1→4) connected mannuronopyranose units and an α-L-(1→4) connected guluronic acid unit at a ratio of 9:1. In addition, 40–60% of the carboxylic functional groups are esterified with propanol, 2-propanol or methanol, and substantially all of the $C_2$ carbons and about 50% of the $C_3$ positions of the residues are sulfated, such that the resulting compound contains about 7–13% organic sulfur. The compounds are used for the prevention and therapy of thrombosis-induced ischemic vascular diseases of the heart and the central nervous system, for treating acute thrombosis-induced brain infarction and in coronary ischemia-induced angina, and for treating hyperlipoproteinemia and lowering the relative amount of cholesterol.

27 Claims, No Drawings

OTHER PUBLICATIONS

Kaiser, "Anticoagulant and Antithrombotic Actions of Recombinant Hirudin," *Seminars in Thrombosis and Hemostasis* 17(2):130–136 (1991).

Lopez–Candales, et al., "Cholesterol Transport Function of Pancreatic Cholesterol Esterase: Directed Sterol Uptake and Esterification in Enterocytes," *Biochemistry* 32(45):12085–12089 (1993).

Markwardt, "Hirudin and Derivatives as Anticoagulant Agents," *Thrombosis and Hemostasis* 66(1):141–152 (1991).

Maron et al., "Revised methods for the *Salmonella* mutagenicity test," *Mutation Research* 113:173 (1983).

Nogrady, "Pro–Drugs and Soft Drugs," *Medicinal Chemistry: A Biochemical Approach*, Oxford Univ. Press, N.Y., pp. 388–392 (1985).

Poledne, et al., "Hyperlipoproteinemia and Experimental Atherosclerosis," *Methods in Animal Physiology* 22:349–360 (1989).

Sebille, "Methods of drug protein binding determinations," *Fundam. Clin. Pharmacol.* 4:Suppl. 2. 151s–161s (1990).

Shih, et al., "Genetic selection, general characterization, and histology of atherosclerosis–susceptible and –resistant Japanese quail," *Atheroscelerosis* 49:41 (1983).

Dialog Abstract 117204848, citing: Wang, et al., "Effect of PSS on platelet aggregation and thrombosis in rats," *Zhongguo Haiyang Yaowu* 11(1):20–22 (1992).

White, "Thrombolytic therapy – still room for improvement, "*Scrip Magazine* pp. 6–7 (1994).

Dialog Abstract 119085666, citing: Zhang, et al., "The effects of PGMS and PSS on erythrocyte deformability in patients with acute mycocardial infarction," *Zhongguo Yaolixue Tongbao* 9(1):61–63 (1993).

Dialog Abstract 122023795, citing: Zhou, et al., "Effect of a polysaccharide sulfate (PSS) on phorbol ester–induced activation of protein kinase C in human erythrocytes," *Zhongguo Haiyang Yaowu* 13(3):11–14 (1994).

Nishide et al., *Nihon Daigaku Nojuigakubu Gijutsu Kenkyu Hokoku*, vol. 49:140–142, (1992) Abstract only).

Iizima et al. *Kitasato Arch. Exp. Med.*, vol. 58(3):59–72, (1985) Abstract only.

LOW MOLECULAR WEIGHT SULFATED POLYSACCHARIDES AND USES THEREOF

FIELD OF THE INVENTION

The present invention relates to compounds that are useful as thrombolytic, antithrombotic, anti-hyperlipoprotein, anti-atherosclerotic plaque formation, and cholesterol lowering agents, and enhancers of cellular and humoral immunological activities. In particular, sulfated oligosaccharides and methods using these sulfated oligosaccharides as anti-thrombotic agents, anti-hyperlipidemic agents and as anti-coagulants are provided.

BACKGROUND OF THE INVENTION

The underlying etiological basis for vascular diseases, such as myocardial infarct, stroke, pulmonary embolism, deep vein thrombosis, peripheral arterial occlusion and other venous thromboses, is either a partial, or total occlusion of a blood vessel by a blood clot-thrombus or thromboembolus. These diseases were traditionally treated with anti-coagulants, such as heparin and coumarin. These antithrombogenic agents inhibit thrombus formation. Traditional anti-coagulant therapy, however, does nothing to directly enhance dissolution of thrombi or thromboemboli. More recently, therapy, particularly for acute episodes of these diseases, involves the use of thrombolytic agents, such as urokinase, streptokinase, and tissue plasminogen activator, which break up the formation of thrombus in the vascular system of a patient.

In maintaining an intact patent vascular bed, the fibrinolytic system is in dynamic equilibrium with the coagulation system. The coagulation system deposits fibrin as a matrix serving to restore a hemostatic condition; whereas, the fibrinolytic system removes the fibrin network after the hemostatic condition is achieved. The fibrinolytic process is brought about by the proteolytic enzyme plasmin that is generated from plasminogen, which is converted to plasmin through activation by an activator, such as tissue plasminogen activator (TPA), streptokinase and urokinase. It has been found that early intervention with these compounds for incidents of acute vascular diseases such as myocardial infarct, stroke, pulmonary embolism, deep vein thrombosis, peripheral arterial occlusion and other venous thromboses, improves survival.

For treatment of cardiovascular disorders and prevention of myocardial infarction, strokes and other such disorders, it is often desirable to treat with a combination of a thrombolytic and anti-thrombotic drugs. Thus, not only are thrombolytic drugs and other treatments needed to keep the vessels in a sustained state of patency, it is critical to also employ anti-thrombotic drugs.

Opening up blocked vessels with thrombolytic drugs and/or angioplasty can be achieved, but does not prevent re-occlusion of the vessel, either from formation of additional thromboses or from restenosis. Atherosclerosis, sometimes referred to as arteriosclerosis, results from the development of an intimal lesion and the subsequent narrowing of the vessel lumen. Commonly, atherosclerosis originally appears as a result of the buildup of plaque which lines the interior of blood vessels, particularly the arteries. Whereas bypass surgery is sometimes employed to replace such clogged arteries, in recent years, a number of surgical procedures have been developed so as to interarterially remove such plaque, often by balloon catheterization or other such treatments in which the plaque is either compressed against or scraped away from the interior surface of the artery. Not infrequently, re-narrowing of the vessel lumen reoccurs in a relatively short period after treatment. This re-narrowing, generally referred to as restenosis, requires a repetition of the surgical procedure to remove the increasing blockage. There is a need exists for preventing such recurrence in patients who have been treated for atherosclerosis.

Heparin and Related Compounds

Heparin and heparan-sulfate are heterogenous glycosaminoclycans composed of D-glucosamine residues and uronic acid residues (L-iduronic acid or D-glucuronic acid). The molecular weight of the chains of these residues varies and is as high as about 50 kD (kilodaltons). The ionic charge of the residues varies as a function of the number of sulfate groups. Heparin and these compounds have activity as anti-thrombotics, but are not thrombolytics. Heparin, which is a heterogeneous mixture of sulfated mucopolysaccharides, is an antithrombin III cofactor, which inhibits clotting factor proteases. The active fraction of heparin binds to antithrombin and catalyzes the antithrombin protease reaction. High molecular weight fractions of heparin markedly inhibit blood coagulation, but have undesirable side effects in many patients.

Propylene Glycol Mannate Sulfate

Historically, seaweeds and extracts thereof have been used as food additives and as pharmaceuticals. These seaweeds contain high molecular weight polysaccharides that have been used to treat so-called "circulatory" disorders. In particular, one such preparation, polysaccharide sulfata [PSS], prepared from brown algae by partial acid hydrolysis, partial sulfation and esterification has been shown to have anti-coagulant properties. This preparation contains a mixture of high molecular weight polysaccharide fragments, and is unstable and undefined.

A more defined, though still heterogenous preparation from brown algae has been prepared. This preparation, propylene glycol mannate sulfate [PGMS] produced by acid hydrolysis, followed by sulfation, and esterification contains mixtures of numerous fragments of molecular weights on the order of about 5 kD to about 10 kD, and is not homogeneous, and does not have well-defined physiochemical, biological and pharmacological properties.

Identification of the pharmacologically active fragments in these preparations has not as been achieved nor has a means for preparation of a chemically homogeneous and pharmacologically active product from this mixture been achieved. Also, current treatments for heart attack patients and for treatments of cardiovascular diseases need to be improved. New thrombolytic and antithrombin agents are needed in order to improve sustained infarct artery patency.

Therefore, it is an object herein to provide compositions and methods for the treatment of acute and chronic cardiovascular diseases and to provide new thrombolytic agents.

SUMMARY OF THE INVENTION

Methods for the treatment of cardiovascular disorders, particularly for limiting myocardial infarction, brain ischemia and infarction, and for preventing blood clots, using sulfated oligosaccharides are provided. These oligosaccharides are extracted from marine algae, particularly from species of the brown algae phaeophyta. The compounds are prepared from the brown algae phaeophyta, a marine macroalgae, by extensive acid hydrolysis, followed by esterification with an epoxide or alcohol, followed by sulfation, so that the 2-position is substantially completely sulfated. Elemental analysis, infra-red spectrocopy, Nuclear-Magnetic Resonance (NMR) spectroscopy studies indicate that the primary structure is a copolymer of β-D-( 1→4) connected mannuronopyranose units and an α-L-(1→4) connected guluronic acid unit at a ratio of 9:1. About 40–60% of the carboxylic groups are esterified and the $C_2$ and the $C_3$ hydroxyl group positions of the cyclic carbon are linked with —$SO_3Na$, so that the organic sulfur content is 7–13% Following the extensive acid hydrolysis, sulfation and esterification the resulting oligomers have molecular weights under 5 kD, and the resulting preparation is substantially homogeneous. The resulting oligosaccharides are sulfated at the 2-position and also on the 3-position of about 50% of the residues and they are esterified at the 6 position of about 50% of the residues. They have anti-thrombotic, thrombolytic and blood viscosity lowering activity. They also have cholesterol-lowering activity and can be used for the treatment of hyperlipidemia.

The preferred oligosaccharides have formula I:

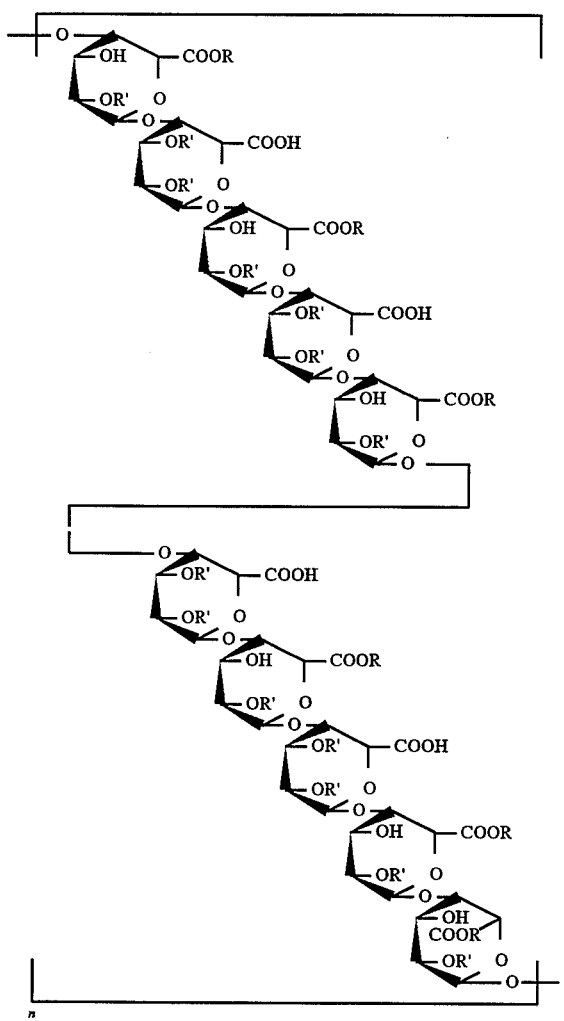

in which R is —$(CH_2)_p CH(OH)(CH_2)_m(CH_3)$ or $CH_2(CH_2)_s OH$ where p, m and s are independently 0 to 6, preferably 0 to 3; m is preferably 0, and s and p are preferably 1; R' is $SO_3Na$; and n is preferably about 1 to about 3, so that the resulting molecular weight is less than about 5 kilodaltons [kD] preferably about 3.5 kD. R is preferably selected from among —$CH_2CH(OH)CH_3$, —$CH_2CH_2OH$ and $CH_2OH$ and n is preferably 2. R is most preferably —$CH_2CH(OH)CH_3$.

The preferred compound in which m is 0, p is 1 and n is 2, is designated oligosaccharide $(M_9G)_2$ in which M is a D-mannuronopyranose and G is L-guluronic acid (as depicted in formula I) at a ratio of 9:1. When isolated from food grade marine brown algae, as described herein, the resulting preparation contains this oligosaccharide at a purity of greater than 99% (as measured by HPLC) compounds.

The compounds provided herein have anti-thrombotic, anti-platelet aggregation, thrombolytic, fibrinolytic, anti-coagulant activity and lipid regulatory activity, including cholesterol lowering activity. These compounds can be used for the prophylaxis and treatment of ischemic and thrombotic vascular diseases of the central nervous system (CNS) and heart. For example, the therapeutic efficacy of oligosaccharide $(M_9G)_2$ in an acute thrombosis-induced brain infarction study approached 95%. The therapeutic efficacy in a coronary ischemia-induced angina study also approached 95%. These compounds are also indicated in the prophylaxis of other forms of thrombotic diseases and exhibit anti-lipid activity. The compounds may also be used as cholesterol-lowering food additives. The compounds are non-toxic with a high margin of safety, high bioavailability and good oral activity.

Compositions containing the compounds are also provided. Such compositions can be used as anti-coagulants, blood thinners, for improving microcirculation, for treating or preventing ischemic disorders of the CNS and cardiovascular system. They thus have use for treating chronic and acute vascular diseases. They can also be used for enhancing cellular and humoral immunological activities. In particular, these compositions and compounds prevent or reduce the immuno-suppressive side-effects associated with the administration of alkylating agents, such as cyclophosphamide, for treatment of certain cancers. These compositions and compounds are also used for treating hyperlipidemia.

The compositions may be formulated for oral, intravenous or parenteral administration. The compositions may be formulated for administration sublingually, as aerosols, as suppositories, and for ophthalmic application.

Methods of therapeutic and prophylactic treatment of ischemic and thrombotic vascular disease of the cardiovascular system and CNS are provided. Methods for increasing the concentration of high density lipoproteins [HDLs] relative to low density lipoproteins [LDLs] and or total cholesterol are provided. Methods for lowering cholesterol are also provided.

Articles of manufacture containing packaging material, a compound provided herein, which is effective as a thrombolytic agent, an anticoagulant, a cholesterol-lowering agent, an immunological activity enhancer or other of the activities disclosed herein, within the packaging material, and a label that indicates that the compound is used for treating acute and chronic cardiovascular disorders, or hyperlipidemia, or ischemic disorders of the vascular system or CNS or as a enhancer of cellular or humoral immunological activities are provided.

DETAILED DESCRIPTION OF PREFERRED EMBODIMENTS

Definitions

Unless defined otherwise, all technical and scientific terms used herein have the same meaning as is commonly understood by one of skill in the art to which this invention belongs. All patents and publications referred to herein are incorporated by reference.

As used herein, alginic acid refers to the high molecular weight (about 240 kD) polymers that are isolated from marine algae.

As used herein, the biological activity or bioactivity of a particular compound includes any activity induced, potentiated or influenced by the compound in vivo or in vitro. It also includes the abilities, such as the ability of certain molecules to bind to particular receptors and to induce a functional response. It may be assessed by in vivo assays or by in vitro assays, such as those exemplified herein.

As used herein, pharmaceutically acceptable salts, esters or other derivatives of the compounds include any salts, esters or derivatives that may be readily prepared by those of skill in this art using known methods for such derivatization and that produce compounds that may be administered to animals or humans without substantial toxic effects and that either are pharmaceutically active or are prodrugs. For example, hydroxy groups can be esterified or etherified.

As used herein, ischemic vascular disease of the brain refers to atherosclerosis of the arteries of the brain, transient ischemic attack, acute infarction of the brain.

As used herein, substantially pure means sufficiently homogeneous to appear free of readily detectable impurities as determined by standard methods of analysis, such as thin layer chromatography (TLC) and high performance liquid chromatography (HPLC), used by those of skill in the art to assess such purity, or sufficiently pure such that further purification would not detectably alter the physical and chemical properties, such as enzymatic and biological activities, of the substance. Methods for purification of the compounds to produce substantially chemically pure compounds are known to those of skill in the art. A substantially chemically pure compound may, however, be a mixture of stereoisomers. In such instances, further purification might increase the specific activity of the compound.

As used herein, substantially homogeneous, refers to preparations in which at least about 99% of the material elutes as a single peak or band or runs as a single band when assessed using high performance liquid chromatograph [HPLC], thin layer chromatography [TLC] or polyacrylamide gel electrophoresis [PAGE]. With reference to the preparations and compounds provided herein, such preparations may contain mixtures of compounds that differ slightly with respect to the particular residues that are esterified or positions that are sulfated, but that on the average have a uniform degree of sulfation, esterification, saccharide constituents, and number of saccharide residues per molecule.

As used herein, biological activity refers to the in vivo activities of a compound or physiological responses that result upon in vivo administration of a compound, composition or other mixture. Biological activity, thus, encompasses therapeutic effects and pharmaceutical activity of such compounds, compositions and mixtures.

As used herein, an oligosaccharide contains about 30 constituent residues.

As used herein, a prodrug is a compound that, upon in vivo administration, is metabolized or otherwise converted to the biologically, pharmaceutically or therapeutically active form of the compound. To produce a prodrug, the pharmaceutically active compound is modified such that the active compound will be regenerated by metabolic processes. The prodrug may be designed to alter the metabolic stability or the transport characteristics of a drug, to mask side effects or toxicity, to improve the flavor of a drug or to alter other characteristics or properties of a drug. By virtue of knowledge of pharmacodynamic processes and drug metabolism in vivo, those of skill in this art, once a pharmaceutically active compound is known, can design prodrugs of the compound (see, e.g., Nogrady (1985) *Medicinal Chemistry A Biochemical Approach*, Oxford University Press, New York, pages 388–392).

As used herein, alkyl, alkenyl and alkynyl refer to straight or branched carbon chains, which may be unsubstituted or substituted, having from 1 to about 20 carbons, preferably 1 to about 10 carbons, more preferably, 1 to 6 carbons. Thus, for example, alkyl includes straight chains, branched chains, and substituted carbon chains, including benzyl and camphor groups.

As used herein, lower alkyl, lower alkenyl, and lower alkynyl refer to carbon chains having less than about 6 carbons. In preferred embodiments of the compounds provided herein that include alkyl, alkenyl, or alkynyl portions include lower alkyl, lower alkenyl, and lower alkynyl portions.

As used herein, a composition formulated for single dosage administration, means that the concentration of active compound in the composition is such that a single dose can be delivered without dilution of the composition.

A. Oligosaccharides from marine brown algae

Compounds represented by formula (I)

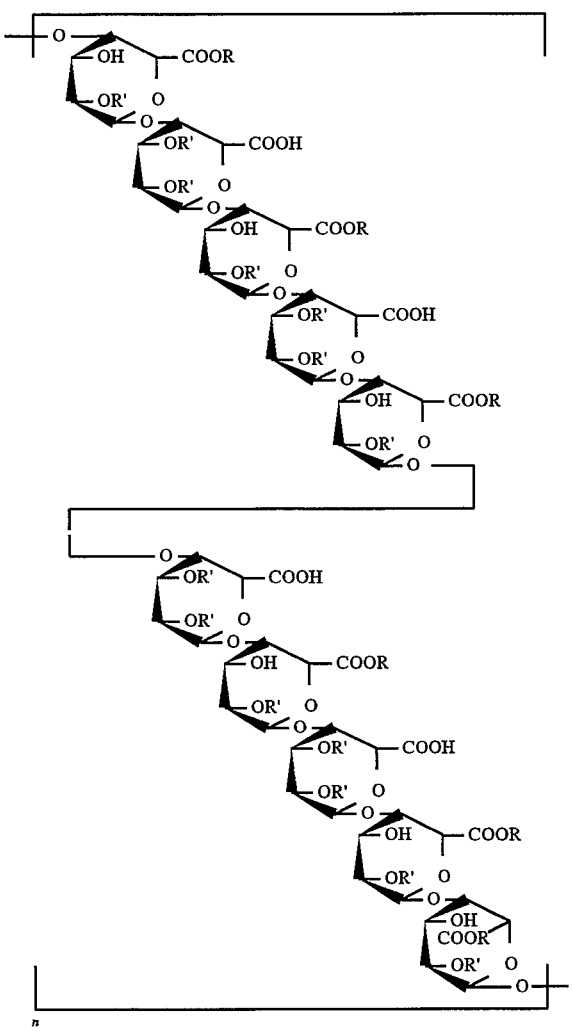

in which R is —$(CH_2)_p CH(OH)(CH_2)_m(CH_3)$ or $CH_2(CH_2)_s OH$ where p, m and s are independently 0 to 6, preferably 0 to 3; m is preferably 0, and s and p are preferably 1; R' is $SO_3Na$; and n is preferably about 1 to about 3, preferably 2, so that the resulting molecular weight is less than about 5 kD are provided. R is preferably selected from among —$CH_2CH(OH)CH_3$, —$CH_2CH_2OH$ and $CH_2OH$ and n is preferably 2. R is most preferably —$CH_2CH(OH)CH_3$ and n is preferably 1–3, more preferably 2. In a preferred embodiment, a compounds in which R is $CH_2CH(OH)CH_3$, R' is $SO_3Na$, and n is 2 is provided.

Pharmacological test results indicate that the compound has significant anti-thrombotic activity, anticoagulation, cholesterol-lowering, blood viscosity lowering activities. It has more significant anti-atherosclerotic activity and it can inhibit crystal growth rate in the urinary tract. General pharmacological experiments demonstrate that it has no significant effect on the blood pressure, electrocardiogram and respiration. The product has no demonstrable toxicity. It is an ideal drug for the prophylaxis and therapy of the cardiovascular disease, particularly indicated for the prevention of diseases. The compounds, thus, can be used for the prophylaxis and therapeutic treatment of high cholesterol and hyperlipidemia as well as ischemic vascular diseases of the heart and brain. It has demonstrated serum lipid lowering, weak anti-coagulant, viscosity lowering and anti-atherosclerosis and improvement of microcirculation activities.

Pharmacokinetic studies indicate that the blood-concentration-time curve of $(M_9G)_2$ fits an open compartment model of distribution. The plasma half-life is 20.09 hr. After intravenous dosing, liver, lung, kidney and muscle drug level peak at 0.50 hr. The peak concentration is highest in the adrenal gland. $(M_9G)_2$ can penetrate the blood-brain barrier. 72 hrs after intravenous dosing, fecal and urine content of the drug were 42.41 and 53.01%, respectively. The overall clearance at 72 hr was 95.42%.

B. Isolation

1. Extraction and acid hydrolysis

The starting material is brown alginate sodium powder, which is primarily composed of high molecular weight linear co-polymeric β-D-(1→4) connected mannuronopyranose units and an α-L-(1→4) connected guluronic acid unit. The brown algae powder obtained from dried algae or food grade, is mixed with distilled water for swelling for up to 3 days [about 50/1 volume of water/mass of algae]. The resulting mixture is then acid hydrolyzed by adding a volume of acetic acid or hydrochloric acid equal to the volume of distilled water and refluxing in a boiling water bath for 6 to 12 hours to allow acid hydrolysis. Afterwards, the material is filtered to remove the acidic solution. The retentate is diluted with distilled water to form a gel and mixed with the same amount (g/g) of 0.5–1.0% solid $Na_2CO_3$ and converted to sodium salt. The pH is adjusted to 2–3 by adding HCl. The material is then centrifuged to remove the "G" [gulose] fragments.

The resulting material is then desalted with a resin (or with an alternating polymeric glucose resin). After desalting, ethanol is added repeatedly to allow precipitation. The precipitate is then mixed with distilled water (⅕ wt precipitate to volume of water) for swelling and then the above steps are repeated to insure complete acid hydrolysis to produce the mannuronic acid oligomers.

2. Esterification

To produce oligosaccharide $(M_9G)_2$, where R is $(CH_2)$ $CH(OH)CH_3$, the above mannuronic acid is mixed with epoxypropane [wt/vol mannuronic acid (g) to epoxypropane (ml) is 2–5]. Where R is —$CH_2CH_2OH$, the mannuronic acid oligomer is esterified with epoxide [$(CH_2)_2O$], and where R is $CH_2OH$, it is esterified with methanol. An equal weight of 0.1% NaOH, KOH, $CH_3COONa$ or the like is added, as a catalyst, to the reaction mixture at a constant temperature (50°–80° C.) and constant pressure (1.5–3 kg/cm$^2$) for 2–4 hours or under atmospheric pressure at 40°–50° C. (reflux) to yield the mannuronic ester.

3. Sulfation

The above mannuronic acid ester is repeatedly washed with methanol or ethanol and dried. At moderate temperature (60°–80° C.), sulfation (typically using chlorosulfonic acid as the sulfation agent and N,N-dimethylformylamide or pyridine as the solvent) produces propylene glycol mannate sulfate ester sulfonic acid material, in which substantially all residues are sulfated at the 2 position and about 50% at the 3 position. Ethanol purification and subsequent neutralization with NaOH yields the mannuronate sulfate sodium.

C. Properties

The resulting compound, in particular oligosaccharide $(M_9G)_2$, is a low molecular weight (Mr~3500) sulfated oligosaccharide having at least about 99% purity and substantial homogeneity. Safety studies, including acute intravenous [IV] and oral gavage to mice, in vitro genotoxicity studies using the AMES' test and clastogenesis test demonstrate that $(M_9G)_2$ is non-toxic and has a large margin of safety in these toxicity tests. Intravenously administered $(M_9G)_2$ at 1024 mg/kg and orally administered $(M_9G)_2$ at 1250 mg/kg to mice did not produce any significant toxicity reaction. Genetic toxicological research indicates that $(M_9G)_2$ did not produce any chromosomal damage and showed a negative result in the AMES test. These studies, thus, indicate that $(M_9G)_2$ is a minimally toxic or non-toxic. Compared to PSS, the toxicity potential is substantially decreased, so that $(M_9G)_2$ can be administered at higher dosages. $(M_9G)_2$ also inhibits lipid peroxides formation and scavenges free radicals. Pharmacokinetics studies show that $(M_9G)_2$ has a high bioavailability, approaching 88.5% and high oral absorption and activity.

It significantly inhibits thrombus formation (the $ED_{50}$= 7.23 mg/kg, $t_{1/2}$=55.4 rain) and has significant in vivo thrombolysis activity. The in vivo thrombolysis activity is significantly better than anti-thrombinase III, and is comparable urokinase.

Oligosaccharide $(M_9G)_2$ has demonstrated anti-thrombotic activity in rabbits, preventing blood clot formation when injected into rabbits at 6 to 50 mg/Kg. $(M_9G)_2$ also has demonstrated thrombolytic activities as evidenced by the ability to lyse preformed rabbit blood clots in vitro, and to lyse preformed rabbit blood clots injected into the pulmonary vasculature in vivo. It exhibits pronounced thrombolytic activity approaching 54% in vivo thrombolysis, which is close to the activity exhibited by urokinase. As further demonstration of its parenteral thrombolytic activity, it has been shown that $(M_9G)_2$ increases the circulating level of degradative fibrin products and decreases euglobin lysis time in rabbit models. This indicates that $(M_9G)_2$ can activate the fibrinolytic pathway in vivo, in a manner similar to that of tissue plasminogen activator (TPA). The therapeutic efficacy against acute thrombosis of the brain is as high as 95.6%, with a highly significant efficacy approaching 70.1%. In these clinical studies, $(M_9G)_2$ significantly improved angina pain and the EKG changes associated with coronary ischemia. Coronary ischemia-associated symptoms such as chest pain, shortness of breath, dizziness and muscle weakness were also improved.

$(M_9G)_2$ has anticoagulant and anti-platelet aggregation and ex vivo clot formation activities, when given orally or parenterally. The parenteral anti-coagulant activity in rabbits is exhibited as an increase of prothrombin time (PT), an increase of thrombin time (TT) and an increase of kaolin partial thromboplastin time (KPTT). $(M_9G)_2$ has an anticoagulant activity with an effect equivalent to ⅓ of PSS and about ⅑ of heparin. Furthermore, it can also decrease the viscosity of blood to improve microcirculation. It also has good orally activity with a high bioavailability (88.3%) and accessibility across the blood brain barrier.

$(M_9G)_2$ has significant cholesterol lowering and a triglyceride lowering activity. It lowers total cholesterol. It also elevates HDL/LDL. When $(M_9G)_2$ is mixed with high cholesterol containing food and given orally to rats and quails [see, e.g., Shih et al. (1983) *Atherosclerosis* 49:41 for a description of the the quail model of atherosclerosis] over an 8-week period, it has demonstrated cholesterol-lowering, anti-hyperlipoprotein and anti-atherosclerotic plaque formation activities. The therapeutic efficacy against hyperlipidemia is higher than 85%.

These compounds provided herein can also be used for enhancing cellular and humoral immunological activities. In particular, these compositions and compounds prevent or reduce the immunosuppressive side-effects associated with the administration of alkylating agents, such as cyclophosphamide, for treatment of certain cancers. Treatment of albino mice with cyclophosphamide substantially reduced white blood cell counts [close to zero]; whereas, treatment with cyclophosphamide and oligosaccharide $(M_9G)_2$ [at 20–80 mg/kg] prevented or reduced this immunosuppressive effect.

In summary, $(M_9G)_2$ is a low molecular weight compound that demonstrated parenteral anti-thrombotic, anti-platelet aggregation, thrombolytic, fibrinolytic and reduced anticoagulant activities. Its pharmaceutical use is for prevention and/or treatment agent of blood coagulation diseases, including ischemic and reperfusion injury of the heart and vessels, ischemic stroke, and hyperlipidemia. It has low-toxicity, a high margin of safety, a high bioavailability and good oral activity. It is thus an ideal pharmacological agent for the prophylaxis and therapeutic of hyper-cholesterol and hyperlidipemia as well as ischemic vascular diseases of the heart and brain.

D. Formulation and Administration of the Compositions

Effective concentrations of the compounds provided herein or pharmaceutically acceptable salts or other derivatives thereof are mixed with a suitable pharmaceutical carrier or vehicle. Derivatives of the compounds, such as salts of the compounds or prodrugs of the compounds may also be used in formulating effective pharmaceutical compositions. The concentrations of the compounds are effective for delivery of an amount, upon administration, that ameliorates the symptoms of the disease. Typically, the compositions are formulated for single dosage administration.

Upon mixing or addition of the compound(s), the resulting mixture may be a solution, suspension, emulsion or the like. The form of the resulting mixture depends upon a number of factors, including the intended mode of administration and the solubility of the compound in the selected carrier or vehicle. The effective concentration is sufficient for ameliorating the symptoms of the disease, disorder or condition treated and may be empirically determined.

Pharmaceutical carriers or vehicles suitable for administration of the compounds provided herein include any such carriers known to those skilled in the art to be suitable for the particular mode of administration. In addition, the compounds may be formulated as the sole pharmaceutically active ingredient in the composition or may be combined with other active ingredients.

The active compounds can be administered by any appropriate route, for example, orally, parenterally, intravenously, intradermally, subcutaneously, or topically, in liquid, semi-liquid or solid form and are formulated in a manner suitable for each route of administration. Preferred modes of administration include oral and parenteral modes of administration. The active compound is included in the pharmaceutically acceptable carrier in an amount sufficient to exert a therapeutically useful effect in the absence of undesirable side effects on the patient treated.

The therapeutically effective concentration may be determined empirically by testing the compounds in known in vitro and in vivo systems as described herein or known to those of skill in this art and then extrapolated therefrom for dosages for humans.

The concentration of active compound in the drug composition will depend on absorption, inactivation and excretion rates of the active compound, the dosage schedule, and amount administered as well as other factors known to those of skill in the art. For example, the amount that is delivered is sufficient to lower cholesterol.

Typically a therapeutically effective dosage should produce a serum concentration of active ingredient of from about 0.1 ng/ml to about 50–100 µg/ml. The pharmaceutical compositions typically should provide a dosage of from about 0.01 mg to about 2000 mg of compound per kilogram of body weight per day. For oral administration as a cholesterol lowering agent, it is expected that the compound will be formulated as a tablet delivering about 100–120 mg per dose, taken two to three times per day.

For oral administration for treatment of ischemic vascular disease the dosage is about 100–120 mg (BID or TID) taken two to three times per day. For intravenous injection, daily dose should not exceed about 4 mg/kg body weight, and should be about 200 mg/day. Intravenous infusion rate should not exceed about 40 drops per minute.

The active ingredient may be administered at once, or may be divided into a number of smaller doses to be administered at intervals of time. It is understood that the precise dosage and duration of treatment is a function of the disease being treated and may be determined empirically using known testing protocols or by extrapolation from in vivo or in vitro test data. It is to be noted that concentrations and dosage values may also vary with the severity of the condition to be alleviated. It is to be further understood that for any particular subject, specific dosage regimens should be adjusted over time according to the individual need and the professional judgment of the person administering or supervising the administration of the compositions, and that the concentration ranges set forth herein are exemplary only and are not intended to limit the scope or practice of the claimed compositions.

If oral administration is desired, the compound should be provided in a composition that protects it from the acidic environment of the stomach. For example, the composition can be formulated in an enteric coating that maintains its integrity in the stomach and releases the active compound in the intestine. The composition may also be formulated in combination with an antacid or other such ingredient. Oral compositions will generally include an inert diluent or an edible carrier and may be compressed into tablets or enclosed in gelatin capsules. For the purpose of oral therapeutic administration, the active compound or compounds can be incorporated with excipients and used in the form of tablets, capsules or troches. Pharmaceutically compatible binding agents and adjuvant materials can be included as part of the composition.

The tablets, pills, capsules, troches and the like can contain any of the following ingredients, or compounds of a similar nature: a binder, such as microcrystalline cellulose, gum tragacanth and gelatin; an excipient such as starch and lactose, a disintegrating agent such as, but not limited to, alginic acid and corn starch; a lubricant such as, but not limited to, magnesium stearate; a glidant, such as, but not limited to, colloidal silicon dioxide; a sweetening agent such as sucrose or saccharin; and a flavoring agent such as peppermint, methyl salicylate, and fruit flavoring. When the dosage unit form is a capsule, it can contain, in addition to material of the above type, a liquid carrier such as a fatty oil. In addition, dosage unit forms can contain various other materials which modify the physical form of the dosage unit, for example, coatings of sugar and other enteric agents. The compounds can also be administered as a component of an elixir, suspension, syrup, wafer, chewing gum or the like. A syrup may contain, in addition to the active compounds, sucrose as a sweetening agent and certain preservatives, dyes and colorings and flavors.

The active materials can also be mixed with other active materials which do not impair the desired action, or with materials that supplement the desired action, such as antacids, H2 blockers, and diuretics. For example, if the compound is used as an anti-thrombotic agent or anticoagulant agent, it may be used with other anti-thrombotic agents or anticoagulant agents, respectively.

Solutions or suspensions used for parenteral, intradermal, subcutaneous, or topical application can include any of the following components: a sterile diluent, such as water for injection, saline solution, fixed oil, polyethylene glycol, glycerine, propylene glycol or other synthetic solvent; antimicrobial agents, such as benzyl alcohol and methyl parabens; antioxidants, such as ascorbic acid and sodium bisulfite; chelating agents, such as ethylenediaminetetraacetic acid (EDTA); buffers, such as acetates, citrates and phosphates; and agents for the adjustment of tonicity such as sodium chloride or dextrose. Parenteral preparations can be enclosed in ampules, disposable syringes or multiple dose vials made of glass, plastic or other suitable material.

If administered intravenously, suitable carriers include physiological saline or phosphate buffered saline (PBS), and solutions containing thickening and solubilizing agents, such as glucose, polyethylene glycol, and polypropylene glycol and mixtures thereof. Liposomal suspensions, including tissue-targeted liposomes, may also be suitable as pharmaceutically acceptable carriers. These may be prepared according to methods known to those skilled in the art. For example, liposome formulations may be prepared as described in U.S. Pat. No. 4,522,811.

The active compounds may be prepared with carriers that protect the compound against rapid elimination from the body, such as time release formulations or coatings. Such carriers include controlled release formulations, such as, but not limited to, implants and microencapsulated delivery systems, and biodegradable, biocompatible polymers, such as collagen, ethylene vinyl acetate, polyanhydrides, polyglycolic acid, polyorthoesters, polylactic acid and others. Methods for preparation of such formulations are known to those skilled in the art.

The compounds may be formulated for local or topical application, such as for topical application to the skin and mucous membranes, such as in the eye, in the form of gels, creams, and lotions and for application to the eye or for intracisternal or intraspinal application. Such solutions, particularly those intended for ophthalmic use, may be formulated as 0.01%–10% isotonic solutions, pH about 5–7, with appropriate salts. The compounds may be formulated as aerosols for topical application, such as by inhalation [see, e.g., U.S. Pat. Nos. 4,044,126, 4,414,209, and 4,364,923].

Finally, the compounds may be packaged as articles of manufacture containing packaging material, a compound provided herein, which is effective for lowering cholesterol or anti-thrombotic, anti-platelet aggregation, thrombolytic, fibrinolytic or anti-coagulant, an immunological activity enhancer or other of the activities disclosed herein, within the packaging material, and a label that indicates that the compound is used for one or more of these purposes, including treating acute and chronic cardiovascular disorders, or hyperlipidemia, or ischemic vascular disease of the brain, including atherosclerosis of arteries of brain, transient ischemic attack, acute infarction of brain and relapse, ischemic disorders of the cardiovascular system or as an immunological enhancer are provided.

Such articles of manufacture include cans, such as externally packaged iron cans, internally packaged with polyethylene bags containing the compounds for infusion.

The following examples are included for illustrative purposes only and are not intended to limit the scope of the invention.

EXAMPLE 1

Preparation of Preparation of $(M_9G)_2$ and Propylene Glycol Mannate Sulfate [PGMS]

A. Preparation of $(M_9G)_2$

1. Acid Hydrolysis

Distilled water [5 L] was added to 100 g brown alginate sodium powder for swelling for 24 h, after which 5 L of 2N acetic acid was added and the mixture was refluxed for 10 h in a boiling water bath. The mixture was filtered to remove the acidic solution, and the filter residue was diluted with 3 L distilled water. For every 100 g solid, 1 g solid $Na_2CO_3$ was added to produce a gel to which HCL was added to adjust the pH to 2.8. The resulting mixture was then centrifuged (centrifugation, 3000 rev/min) for separation. The supernatant was desalted with anionic and cationic exchange resins, respectively. After removal of the resins, 3 volumes of ethanol were added for precipitation.

The precipitate was dried to a powder, 1 L of distilled water was added to swell the powder, 1 L of 2N acetic acid was added. The mixture was again refluxed in a boiling water bath for 10 hrs. The reaction mixture was then filtered to remove the acidic solution, 200 ml distilled water was added to the filtrate and powdered $Na_2CO_3$ (1% Of the weight of the precipitate) was added. The pH was adjusted to 2.8 with 4HCl, and the solution is centrifuged to isolate the supernatant. The supernatant was desalted with resins. Three volumes of ethanol were added for precipitation, and the precipitate was dried at 60° C. to obtain a mannuronic acid-containing oligosaccharide.

2. Esterification

The above mannuronic acid-containing oligosaccharide [70 g] was mixed in 3 g water, and 300 ml epoxypropane and 0.7 g NaOH were added in a high pressure reaction vessel. Afterwards, the reaction mixture was washed 3 times with ethanol. The material was then dried at 60° C., to produce the ester.

3. Sulfation

In a 3000 ml flask with a stirrer and a thermometer, the above mannuronate [2., above, 100 g] and 1000 ml N,N-dimethylformylamide were slowly stirred to mix homogeneously. The temperature was controlled with an ice-bath and prevented from going higher than 50° C. Chlorosulfonic acid [300 ml] was then added. After addition of acid, the temperature was elevated to 65°–70° C. and the mixture stood for 3 h. The reaction mixture was then cooled, filtered and precipitated with the addition of 4000 ml ethanol. The precipitate was dissolved in 200 ml distilled water and then re-precipitated with ethanol. This precipitation step was repeated 3 times and the precipitate was redissolved in water and desalted with anionic and cationic exchange resin. The final product oligosaccharide $(M_9G)_2$ was precipitated by addition of ethanol and 4N NaOH to adjust the pH to 8.

The resulting compound [oligosaccharide $(M_9G)_2$] is a white to light yellowish amorphous powder, odorless and tasteless and hydroscopic. It is readily soluble in water, and insoluble in acetone and ether.

B. Preparation of Propylene Glycol Mannate Sulfate [PGMS]

For comparison, PGMS was prepared by the following procedure, which differs in the extent of acid hydrolysis from the above process. As a result, the end product is heterogeneous, and has lower activity than oligosaccharide $(M_9G)_2$.

1. Preparation of Propylene Glycol Mannate Acid

Brown algae powder (100 gm) obtained from dried, phaeophyta, a marine macroalgae, was mixed with 5000 ml distilled water and allowed to swell for 3 days. Acetic acid (5000 ml, 2N) was added and the mixture refluxed in a boiling water bath for 10 hours. The mixture was filtered to remove the acidic solution, the retentate was diluted in 3000 ml distilled water and then, for every 100 g retentate, 1 g solid $Na_2CO_3$ was added. HCl was then added to the mixture, which is in a gel state, to adjust the pH to 2.8. and the resulting mixture was centrifuged (centrifugation, 3000 rev/min) for separation. The supernatant is desalted with anionic and then cationic ionic exchange resins. After removal of the resins, 3 volumes of ethanol were added for precipitation. The precipitate (propylene glycol mannate acid) was dried at 60° C.

2. Preparation of Propylene Glycol Mannate Ester

The above propylene glycolic acid (70 g) was mixed in 30 g water, and 300 ml of epoxypropane was added in a high pressure reaction vessel, after which 0.7 g NaOH was added. The reaction mixture was washed with ethanol 3 times and dried with ethanol 3 times. The material was then dried at 60° C. to yield propylene glycol mannate ester.

3. Preparation of Propylene Glycol Mannate Sulfate Sodium Salt

Propylene glycol mannuronate ester (100 g) was introduced into a 3000 ml flask, with a stirrer and thermometer in the flask, and methylamine solvent (1000 ml). The resulting mixtures was slowly stirred to produce a homogeneous mixture to which chlorosulfonic acid (300 ml) was added. The temperature was controlled (with an ice-bath), such that it was maintained at 5° C. or lower. After addition of acid, the temperature was elevated to 65°–70° C. and the mixture was kept at this temperature for 3 hours. The reaction mixture was then cooled, filtered and precipitated with the addition of 4000 ml ethanol. The precipitate was dissolved in 200 ml distilled water and then re-precipitated with ethanol. The process was repeated 3 times and the precipitate was redissolved in water and desalted with anionic and cationic exchange resins. NaOH (4N) was added to adjust the pH to 8, ethanol was added to precipitate the resulting propylene glycol mannate sulfate sodium salt.

EXAMPLE 2

$(M_9G)_2$ Toxicity Testing

The experiments included acute and genetic toxicology experiments. The results show that intravenously administered $(M_9G)_2$ at 1.0 g/kg and orally administered $(M_9G)_2$ at 12.5 g/kg, respectively, did not yield any toxicity effects in mice. There appeared to be no detectable genetic toxicity potential.

A. Oral Dosing

1. Materials

Animals: albino mice (male/female=1:1), with bodyweight in 18 to 22 gram range, were provided by the Experimental Animal Research Center, Shandong Medical University.

2. Method—Determination of the Maximum Tolerant Oral Dose of $(M_9G)_2$ in Mice

Ten male and 10 female 5–6 week old albino mice, with bodyweight in 19 to 20 g range, were orally gavaged with 1 ml of $(M_9G)_2$ 25% solution (250 mg/animal) once. The animals were housed at room temperature (20°±1° C.) for 1 week of laboratory observation.

3. Results

The animals exhibited normal behavior signs, increased body weight, moved around freely in the cage with no clinical signs of toxicity and no deaths. The oral dosage was 12.5 g/kg. The dosage is 7485 fold of the estimated adult human oral dose (1.67 mg/kg) and 2500 fold of the adult daily dose (5 mg/kg). Since no oral $LD_{50}$ could be determined, it appears that $(M_9G)_2$ is minimally toxic or non-toxic.

B. Injectable $(M_9G)_2$

Fifty 5–6 week old male and female albino mice, with body weight in the 18 to 22 g range, were randomized into 5 groups. The $LD_{50}$ was determined by the Kaeber's method, with a dosage scale of 1:0.8 (dose volume=0.25 ml/10g). After intravenous dosing, the animals were housed at room temperature (20°±1° C.) for 1 week laboratory observation. The mortality in each dosage group is recorded as follows:

TABLE 1

Determination of $LD_{50}$ of Intravenously Administered $(M_9G)_2$ in Mice

| Group | Animal Number | Dose (g/kg) | Death |
|---|---|---|---|
| 1 | 10 | 2.50 | 10 |
| 2 | 10 | 2.00 | 9 |
| 3 | 10 | 1.60 | 4 |
| 4 | 10 | 1.28 | 1 |
| 5 | 10 | 1.024 | 0 |

The $LD_{50}$, which was calculated according to Kaerber's formula, of the intravenously dosed $(M_9G)_2$ in the mice was 1636 mg/kg. This is equivalent to about 491 times a human adult intravenous dose (200 mg/kg). The 95% confidence limit of the $LD_{50}$ is ~1490–1785 mg/kg.

EXAMPLE 3

Mutagenicity Study Using the Ames Test

Genetic toxicity tests show that $(M_9G)_2$ did not produce chromosome damage and produced a negative result in the AMES test.

$(M_9G)_2$ drug substance was subjected to the AMES test, the most widely used mutagen/carcinogen screening assay [see, e.g., Ames et al. (1975) *Mutation Res.* 31: 347–364; Ames et al. (1973) *Proc. Natl. Acad. Sci. U.S.A.* 70: 782–786.; Maron et al., (1983) *Mutation Research* 113: 173; Ames "The detection of chemical mutagens with enteric bacteria in a Hollander", Chemical Mutagens, Principles and Methods for their detection, Vol. 1, Phenum Press, New York, 1971, pp 267–282]. This test uses several unique strains of *Salmonella typhimurium* that are histidine-dependent for growth and that lack the usual DNA repair enzymes. The frequency of normal mutations that render the bacteria independent of histidine (i.e., the frequency of spontaneous revertants) is low. The test evaluates the impact of a compound on this revertant frequency. Because some substances are converted to a mutagen by metabolic action, the compound to be tested is mixed with the bacteria on agar plates along with the liver extract. The liver extract serves to mimic metabolic action in an animal. Control plates have only the bacteria and the extract. The mixtures are allowed to incubate. Growth of bacteria is checked by counting colonies. A test is positive where the number of colonies on the plates with mixtures containing a test compound significantly exceeds the number on the corresponding control plates.

Results

The test strain revertant colony number (X±SD) exceed 2 times of the normal control or the revertant number is dose-dependant on repeat are considered positive.

A. Pretest: When tested at the highest concentration (5000 μg/dish), TA100 revertant colony number falls in the normal range. Under microscopic examination, bacterial growth was normal, and the colony morphology was intact. Similar results were obtained with the other three test strains. The results show a weak growth inhibitory effect on the bacteria at the highest dose.

B. Regular Test: The results showed that the number of revertants in the blank control group and the solvent control groups are similar, both fluctuate in the normal range. The number of revertants in the six diagnostic positive control groups showed the significant increase over 2-fold than the control group. Thus these results indicate that the test methods are valid.

C. The results for $(M_9G)_2$ show that in 40 combination test arrangement groups, including 4 test strains and 5 test levels, there was no significant increase in revertant colony number. Therefore, the results from this experiment show that the test material, $(M_9G)_2$ has no detectable mutagenic activity.

EXAMPLE 4

$(M_9G)_2$ Pharmacokinetics

A single oral dose of $[^3H\text{-}[(M_9G)_2]$, yielded a blood-concentration-time curve that is best fitted with a two-compartment model of distribution. The plasma half-life is 20.1 hr. After intravenous dosing, liver, lung, kidney and muscle drug level peak at 0.50 hr. The peak concentration is highest in the adrenal gland. $(M_9G)_2$ can penetrate the blood-brain barrier. 72 hrs after intravenous dosing, fecal and urine content of the drug were 42.4 and 53%, respectively. The overall clearance at 72 hr was 95.4%.

A. Materials:

1. Animal Mice: albino (male:female=1:1), with body weight at 20±2 g were provided by the Experimental Animal Research Center, Shandong Medical University.

2. $[^3H]\text{-}(M_9G)_2$: Specific activity 0.148 GBq/ml (4 m Ci/ml) was labelled and prepared by the Chinese Atomic Energy Research Center 3. Instruments: Beckman LS 9800 scintillation counter B. Methods and Results 1. Absorption: Normal healthy albino mice were randomized into 7 groups. Each animal was orally garaged with oligosaccharide $(M_9G)_2$ (25 mg/kg, containing a known amount of $[^3H](M_9G)2$. Then at designated time points 10 μl blood samples from the tail vein were collected. The radioactivity of the blood sample in the counting vial was determined to calculate the concentration of $(M_9G)_2$ in the blood. The results show that after oral gavage with $[^3H]$ $(M_9G)_2$, the plasma drug time curve is best fitted with a two compartment model. The plasma concentration of the drug is shown in Table 2 and the calculated [from data in Table] pharmacokinetics parameters are shown in Table 3.

TABLE 2

Plasma Concentration as a Function of Time after Oral Administration of $[^3H](M_9G)_2$ (n = 5)

| Time | μg/ml |
|---|---|
| 0.17 | 0.35 |
| 0.33 | 0.40 |
| 0.5 | 0.43 |
| 1 | 0.47 |
| 2 | 0.43 |
| 6 | 0.37 |
| 8 | 0.35 |
| 12 | 0.34 |
| 24 | 0.34 |

N = 5, mix $[^3H]\text{-}(M_9G)_2$ with unlabelled $(M_9G)_2$ oral gavage, 10 μl tail vein blood, scintillation counting $[^3H]\text{-}(M_9G)_2$, 25 mg/kg oral dose

TABLE 3

$[^3H]\text{-}(M_9G)_2$ Orally Administered Pharmacokinetic Parameters

| Parameter* | Unit | Value |
|---|---|---|
| A1 | μg/ml | 1.99 |
| A2 | μg/ml | 0.457 |
| α | h$^{-1}$ | 1.036 |
| β | h$^{-1}$ | 0.0345 |
| Ka | h$^{-1}$ | 1.327 |
| $t_{+e,fra\ 1/2}$+ee Ka | h | 0.522 |
| $t_{+e,fra\ 1/2}$+ee α | h | 0.699 |
| $t_{+e,fra\ 1/2}$+ee β | h | 20.09 |
| Vα | l | 1087.7 |
| AUC | mg/l · h | 13.24 |
| Cl | l/hr | 0.03776 |
| Tm | h | 0.94 |
| Cm | μg/ml | 0.437 |
| F | % | 83.03 |

*Parameters:
A1 intercept of monoexponential decline line of α slope with ordinate in the open two-compartment model
A2 intercept of monoexponential decline line of β slope with ordinate in the open two-compartment model
α & β slopes of monoexponential decline in each compartment
Ka disposition rate constant
$t_{+e,fra\ 1/2}$+ee α half-life of α phase
$t_{+e,fra\ 1/2}$+ee β half-life of β phase
Vα volume of distribution
AUC area under the curve
Cl clearance
Tm time at which maximum concentration reached
Cm maximum concentration
F fraction of bioavailability 2. Gallbladder After oral administration, the radioactivity in the gall bladder was determined every hour for 12 hrs. The results show that the 12 hr cumulative amount of radioactive $(M_9G)_2$ is 0.64% of the total administered dose. The result is shown in the following table:

TABLE 4

| | [³H]-Radioactivity in Gallbladder (%) |
|---|---|
| TIME (hr) | Amount × 10000% |
| 1 | 23.89 |
| 2 | 2.45 |
| 3 | 1.17 |
| 4 | 2.66 |
| 5 | 2.30 |
| 6 | 1.42 |
| 7 | 2.31 |
| 8 | 1.07 |
| 9 | 1.19 |
| 10 | 1.42 |
| 11 | 2.25 |
| 12 | 1.08 |
| TOTAL | 64.08 |

These results are consistent with enterohepatic recirculation of orally absorbed, pre-systemic metabolized material orally administered [³H]-($M_9G$)$_2$ plus ($M_9G$)$_2$.

3. Plasma Protein Binding

Plasma protein binding was determined using a dialysis membrane method [see, e.g., Seville (1990) *Fundam. LCin. Pharmacol.* 4 Suppl 2:151s–161s] as 54.9%.

4. Bioavailability

The bioavailability was determined from the area under the curve as 88.03% [see Table, above].

5. Tissue Distribution: Isolated Tissue Concentration Determination

After mice were orally gavaged with [³H](M9G)$_2$ at 0.5, 2, 4, 12 and 24 hr time points, isolated tissues of brain, heart, lung, liver, spleen, kidney, adrenal gland, thymus gland were obtained and muscle content of radioactivity was determined to calculate the tissue concentration of drug.

The results show that 0.5 hr after administration the liver, lung, kidney and muscle concentration of drug was highest. Two hrs. after administration, the levels in these tissues increases, but the concentration of drug in other tissues increased; the highest concentration appeared in the adrenal gland. It also appear that the drug can cross the blood-brain barrier.

6. Whole Body Autoradiography

Mice were orally gavaged with [³H](M9G)$_2$, 0.5, 1 and 3 hrs afterwards, the animals were anesthetized and sacrificed. The whole animal was cryo-embedded with carboxycellulose and sliced into 40 μm sections and layered on films for exposure. The films were then fixed to indicate the distribution of the radioactivities in the tissues and organs.

The results show that at 0.5 hrs, kidney and bladder area clearly showed the autoradiographic image while other tissues only vaguely showed any image. At 1 hr time point, stomach, intestine and bladder showed autoradiographic image. At 3 hr, with the exception of residual image in the stomach and intestine, the autoradiographic image in other tissues and organs are fading.

7. Excretion

Mice were orally gavaged with [³H]($M_9G$)$_2$ and individually kept in metabolic cages. Urine and feces samples were collected at 6, 12, 24, 48 and 72 hrs. The urinary volume was determined and then a specific volume of urine sample was put into scintillation vial to determine the radioactivity. Feces was allowed to dry. After weight determination, a specific amount of samples was put into a scintillation vial to determine the radioactivity. The results were added to determine the total amount of excreted urine and feces, and then percentage of the total amount, respectively.

The results show that cumulative urinary and fecal excretion were 42.41% and 53.01% of the administered dose. The total excretion was 95.42%.

EXAMPLE 5

Anti-Thrombotic Activity

The results show that intravenously administered ($M_9G$)$_2$ at 6.25, 12.5 and 25 mg/kg had significant anti-thrombotic activity. Intravenously administered ($M_9G$)$_2$ at 25 mg and 50 mg/kg had significant in vivo thrombolysis activity; at 6.25 mg and 25 mg/kg, it had significant ex vivo thrombolysis activity. The $ED_{50}$ of experimental anti-thrombotic activity was 7.2 mg/kg. The anti-thrombotic half-life was 55.4 min. In addition, ($M_9G$)$_2$ could increase the content of the serum fibrin degradative protein (FDP), decrease serum fibrinogen (Fg) content and shorten the euglobulin lysis time and increase fibrinolysis activity. The in vivo thrombolysis activity is significantly better than anti-thrombin enzyme III. At 50 mg/kg, the in vivo thrombolysis activity approached 54%, an effect similar to that of urokinase.

A. Ex Vivo

1. Intravenous Treatment of Rabbits With ($M_9G$)$_2$ or Saline Control a. Procedure Blood [1 ml] was removed from the carotid artery of treated animals and quickly injected into clot formation tubes. The tubes were centrifuged at 17 revolution/minute at 37°±0.5° C. for 15 min to allow clot formation. The wet weight of the clot was determined. The clot was dried at 60° C. overnight, and dry weight was determined.

b. Results

TABLE 5

Ex Vivo Anti-Thrombotic Activity (N = 6)

| Group | Dose (mg/kg) | Wet Weight (mg) X ± SD | | |
|---|---|---|---|---|
| | | Before* | 15 min after | 60 min after |
| saline | — | 61 ± 9 | 58 ± 9 | 60 ± 13 |
| ($M_9G$)$_2$ | 25 | 65 ± 14 | 0 ± 0 | 0 |
| ($M_9G$)$_2$ | 12.5 | 64 ± 12 | 0 ± 0 | 7 ± 15 |
| ($M_9G$)$_2$ | 6.25 | 71 ± 8 | 1.0 ± 2.24 | 51 ± 3.6 |
| heparin | 83 u/kg | 63 ± 8 | 2.0 ± 4.5 | 51 ± 23 |

*Before and after treatment.

2. Ex Vivo Thrombolysis of Preformed Rabbit Blood Clot a. Procedure

A rabbit arterial blood clot [1 ml] was preformed at 37° C., for 60 min. The clot was incubated in vitro with the drug (0.1 ml, 6 groups) in the clot forming tube at 37° C. for 60 min. At the end of the incubation, the clot was removed and its wet weight determined. It was then dried overnight and its dry weight was determined.

b. Results

TABLE 6

Ex Vivo Thrombolysis Assay (N = 6 rabbits)

| Group | Dose mg/Kg | Wet Weight X ± SD | Dry Weight % X ± SD | Dissolution % |
|---|---|---|---|---|
| saline | 0 | 56.5 ± 5 | 16.8 ± 2 | — |
| ($M_9G$)$_2$ | 25 | 42.5 ± 4* | 11.2 ± 1.4* | 27.1 ± 9* |
| ($M_9G$)$_2$ | 6 | 46 ± 8* | 11.9 ± 1.8 | 21.2 ± 11.4 |
| Positive | 0.1 U/ml | 33 ± 11* | 8.1 ± 3* | 44.1 ± 18* |

TABLE 6-continued

Ex Vivo Thrombolysis Assay (N = 6 rabbits)

| Group | Dose mg/Kg | Wet Weight X ± SD | Dry Weight % X ± SD | Dissolution % |
|---|---|---|---|---|
| Control Heparin | 335 U/ml | 56 ± 9 | 14.1 ± 3.2 | 4.7 ± 8.5 |

*p<0.05 compared with saline control group

B. In Vivo

Rabbits were anesthetized and surgically instrumented using an established method in which the right carotid artery was connected via a polyethylene tube to the left external carotid vein. A 15 cm [#4] surgical wire was left in the polyethylene tubing for thrombus formation. The animals were then treated with saline or drug intravenously for 10 minutes and the arterial-venous shunt was connected to allow blood flow for 15 minutes. The wire was then retrieved and weighed to determine the thrombus weight. The degree of inhibition was calculated based on saline control as 0% inhibition.

1. Experiment 1:

TABLE 7

In Vivo Antithrombotic Effects of Intravenously Administered $(M_9G)_2$ in an Experimental Thrombosis Rabbit Model (N = 5 rabbits)

| Group | Dose (mg/kg) Intravenous Dose | Thrombus Wet Weight X ± SD mg | Inhibition of Thrombus % |
|---|---|---|---|
| saline control | 2 ml | 71.6 ± 15.5 | 0 |
| PSS | 25 | 22.2 ± 12.1** | 69 |
| $(M_9G)_2$ | 50 | 17.2 ± 6.5*** | 76 |
| $(M_9G)_2$ | 25 | 21.6 ± 11.3** | 69.8 |
| $(M_9G)_2$ | 12.5 | 43.8 ± 12.8* | 38.8 |
| $(M_9G)_2$ | 6.25 | 52.0 ± 16.1 | 27.4 |

*p<0.05
**p<0.01
***p<0.001

2. Experiment 2:

TABLE 8

Comparison of $(M_9G)_2$ and Heparin Thrombosis Assay (N = 6 rabbits)

| | | wet weight inhibition | | | |
|---|---|---|---|---|---|
| Group | Dose (mg/kg) | Before* | 15 min | 60 min | 120 min |
| $(M_9G)_2$ | 25 | 0 | 100 | 100 | 49 |
| $(M_9G)_2$ | 12.5 | 0 | 100 | 90 | 44 |
| $(M_9G)_2$ | 6.25 | 0 | 97 | 41 | 0 |
| heparin | 83 u/kg | 0 | 97 | 20 | 0 |

*Before treatment; time after treatment

C. In Vivo Thrombolysis Activity in Rabbits

1. Procedure—Acute Experimental Pulmonary Arterial Thrombosis in Rabbits

A 30 mg rabbit blood clot was freshly prepared and stained with Evan's Blue and then injected via the jugular vein into the pulmonary artery. The animals were injected with saline [negative control] or oligosaccharide $(M_9G)_2$ at 5, 24 and 125 mg/kg or with snake venom [positive control]. The animals were sacrificed 24 hours later and the stained blood clot was removed from the lung to determine wet and dry weights.

2. Results

TABLE 9

In Vivo Thrombolysis Assay (N = 6)

| Group | Dose (mg/Kg) | Before Clot Weight mg (X ± SD) | Clot Weight mg (X ± SD) | Thrombolysis % |
|---|---|---|---|---|
| saline | — | 36.3 ± 1.7 | 12.5 ± 3.5 | 34 |
| $(M_9G)_2$ | 50 | 39.2 ± 3.5 | 21.2 ± 2.5* | 54*** |
| $(M_9G)_2$ | 25 | 36.5 ± 4.1 | 17.2 ± 3.1* | 47* |
| $(M_9G)_2$ | 12.5 | 38.1 ± 1.9 | 15.7 ± 2.5 | 41 |
| Positive** Control | 20 U/Kg | 37.9 ± 2.1 | 14.3 ± 2.5 | 38 |

*p>0.05
**A snake venom derived thrombolysis enzyme
***Activity approaching that of urokinase

EXAMPLE 6

Anti-Coagulant and Anti-Platelet Aggregation Activity

The results show that $(M_9G)_2$ has significant anti-coagulant and anti-platelet aggregation activities. The activities are linearly dependant on the dosage of oligosaccharide $(M_9G)_2$. The anti-coagulant activity is about ⅓ of that of PSS, and about ⅑ of that of heparin.

The results also show that orally or intravenously administered $(M_9G)_2$ significantly lowers the viscosity of mouse blood.

A. Effects of $(M_9G)_2$ on Platelet Aggregation

Animals were orally gavaged with drug for 1 hr. Blood samples were collected from dorsal aorta with citrate as anticoagulant. Platelet rich plasma (PRP) were isolated by differential centrifugation and used in a platelet aggregameter, using 10 μM ADP as the aggregation initiator.

TABLE 10

A Single Dose of Orally Administered $(M_9G)_2$ Inhibits
Ex Vivo ADP-induced Platelet Aggregation (N = 8 rats)

| Group | Dose (mg/kg) Oral Gavage | Platelet Aggregation X ± SD % | Inhibition of Aggregation % |
|---|---|---|---|
| saline control | 8 ml | 73.5 ± 3.77 | — |
| PSS | 500 | 45.47 ± 7.12** | 38.2 |
| $(M_9G)_2$ | 500 | 42.94 ± 8.62** | 41.6 |
| $(M_9G)_2$ | 250 | 35.83 ± 6.25* | 24.1 |

B. Orally Administered Oligosaccharide $(M_9G)_2$ Prevents Ex Vivo Blood Coagulation in Rats Animals were orally dosed with $(M_9G)_2$ and anesthetized with ether 1 hr later. Blood samples (1.8 ml) were quickly collected from dorsal aorta and injected into an XSN-RII ex vivo blood clot formation cup. The cup was rotated at 17 revolution/minute at 37°±0.5° C. for 15 min to allow clot formation. The wet weight and dry weight of the blood clot were measured to determine the % inhibition of blood coagulation.

TABLE 11

A Single Dose of Orally Administered $(M_9G)_2$ Inhibits
Ex Vivo Blood Clot Formation in Rats (N = 8)

| Group | Dose (mg/kg) Oral Gavage | Thrombus (clot) Weight Wet | Dry | Inhibition % of Thrombus Wet | Dry |
|---|---|---|---|---|---|
| saline control | 16 ml | 110.5 ± 23.0 | 26.5 ± 4.9 | — | — |
| PSS | 500 | 90.6 ± 7.9* | 20.4 ± 2.3 | 18.0 | 23.0 |
| $(M_9G)_2$ | 700 | 83.8 ± 15.9*** | 17.5 ± 2.9*** | 24.2 | 33.9 |
| $(M_9G)_2$ | 500 | 87.8 ± 13.9** | 18.5 ± 4.2** | 20.5 | 30.2 |
| $(M_9G)_2$ | 300 | 95.4 ± 6.0* | 4.6 ± 4.9* | 13.7 | 18.5 |

TABLE 12

$(M_9G)_2$ Effect on Coagulation Activity in Rabbits

| Group | N | Dose (IV) mg/Kg | ELT time (min) pre | 15 min post | 60 min post |
|---|---|---|---|---|---|
| saline | 5 | — | 286 | 270 | 287 |
| $(M_9G)_2$ | 6 | 25 | 290 | 71* | 136* |
| $(M_9G)_2$ | 6 | 6.25 | 287 | 90* | 177* |
| Heparin | 5 | 333 U/Kg | 283 | 124* | 197* |

X shown; SD usually less than 10% of X
ELT:englobulin (euglobulin) lysis time; a measurement of in vivo plasmin and Fibrinolysis activity similar to those of TPA

TABLE 13

$(M_9G)_2$ Fibrinolysis Activity in Rabbits

| Group | N | Dose (IV) mg/Kg | FDP mg/L pre | 15 min post | 60 min post |
|---|---|---|---|---|---|
| saline | 5 | — | 0 | 0 | 0 |
| $(M_9G)_2$ | 6 | 25 | 0 | 53 ± 16* | 5 ± 3* |
| $(M_9G)_2$ | 6 | 6.25 | 0 | 22 ± 10 | 1 ± 1.1 |
| Heparin | 4 | 333 U/Kg | 0 | 18 ± 9 | 6 ± 6. |

*better than Heparin
FDP: Fibrin degradation protein
X shown, SD usually less than 20% of mean

EXAMPLE 7

Experimental Hypercholesterolemia and Atherosclerosis

The results show that $(M_9G)_2$ [mixed with food] prevents hypercholesterolemia and that $(M_9G)_2$ prevents atherosclerosis plaque formation. The experiments include the prophylaxis of $(M_9G)_2$ in the experimental atherosclerosis in a quail model and a hyperliproproteinemia model of the rat to test the modulatory effects of $(M_9G)_2$ on serum lipoproteins and acetaldehyde. The results show that orally administered $(M_9G)_2$ at 25 and 50 mg/kg can significantly lower the total cholesterol (TC) and (LDL+vLDL)-C [vLDL=very low density lipoprotein], elevate the (HDL-C) and $(HDL_2$-C) content, elevate (HDL-C)/TC, and $(HDL_2$-C)/$(HDL_3$-L) ratio and significantly decrease cholesterol and cholesterol lipid deposition in the arterial-wall of the quail model. $(M_9G)_2$ can also inhibit the formation of lipoperoxides in the arterial wall and decrease the cholesterol content in the liver, and therefore has protective effect for the liver. Furthermore, $(M_9G)_2$ can lower the total cholesterol, (VLDL+LDL)-C elevate, HDL-C and $(HDL_2$-C)/TC ratios in the experimental hypercholesterolnemic rats model. The pharmacological activity increased with oral dose levels.

TABLE 14

Anti-Hyper-cholesterolemia Activity in Quail

| | Group | Weeks (serum cholesterol) mmol/L X ± SD 0 | 2 | 4 | 8 |
|---|---|---|---|---|---|
| I. | normal diet | 5.2 ± 0.5 | 5.2 ± 0.5 | 5.2 ± 0.9 | 5.7 ± 1.1 |
| II. | H-C diet | 5.3 ± 0.5 | 63 ± 17 | 64 ± 13.1 | 65 ± 12.4 |

TABLE 14-continued

Anti-Hyper-cholesterolemia Activity in Quail

| | Group | Weeks (serum cholesterol) mmol/L X ± SD | | | |
|---|---|---|---|---|---|
| | | 0 | 2 | 4 | 8 |
| III. | H-C diet + $(M_9G)_2$ 50 g/Kg | 5.2 ± 0.4 | 19 ± 8.8* | 22 ± 8.6* | 27 ± 11.8* |
| IV. | H-C diet + $(M_9G)_2$ 25 mg/Kg | 5.3 ± 0.5 | 30 ± 13.6* | 33 ± 12.5* | 37 ± 15.5* |

H-C = high cholesterol

TABLE 15

Effects of $(M_9G)_2$ on HDL/TC Ratio

| | GROUP | WEEKS | | | |
|---|---|---|---|---|---|
| | | 0 | 2 | 4 | 8 |
| I | normal diet | 58 ± 7 | 58 ± 2 | 5 ± 1.5* | 5 ± 1.6* |
| II | H-C | 57 ± 8 | 5 ± 7 | 58 ± 10 | 56 ± 13 |
| III | H-C diet + $(M_9G)_2$ 50 mg/Kg | 56 ± 8 | 19 ± 8* | 19 ± 9* | 15 ± 3 |
| III | H-C diet + $(M_9G)_2$ 50 mg/Kg | 56 ± 8 | 19 ± 8* | 19 ± 9* | 15 ± 3 |
| IV | H-C diet + $(M_9G)_2$ (po) 25 mg/Kg | 5.3 ± 0.5 | 30 ± 13.6* | 33 ± 12.5* | 37 ± 15.5* |

TABLE 16

Anti-Hyperlipoproteinic Activity in Rats

| Group | Dose mg/Kg (PO) | TC mmol/L | TG mmol/L | MDA mmol/L | $P_{TC}$ % |
|---|---|---|---|---|---|
| NS (normal) | — | 1.8 | 0.9 | 1.1 | |
| NS (high) | — | 6.7 | 1.0 | 3.0 | |
| $(M_9G)_2$ | 10 | 5.5 | 0.9 | 2.2* | 24 |
| | 30 | 4.8* | 0.8 | 2.0* | 38 |
| | 60 | 4.4* | 0.7* | 1.9* | 46 |
| | 100 | 3.3* | 0.3* | 1.3* | 09 |
| | 300 | 3.2* | 0.2* | 1.2* | 72 |
| clofibrate | 300 | 4.0* | 0.4* | 1.2* | 53 |

$\bar{X}$ shown, SD usually less than 15% of $\bar{X}$
MDA = malondialdehyde
$P_{TC}$ % = percent inhibition of total cholesterol [TC].

TABLE 17

Effect of $(M_9G)_2$ on the amount of arterial MDA in quail after 8 weeks (N = 6)

| | (μmol/100 mg, $\bar{X}$ ± SD) | |
|---|---|---|
| | MDA | P |
| I | 2.03 ± 0.75 | |
| II | 10.17 ± 2.97 | <0.001 VS I |
| III | 4.28 ± 1.12 | <0.001 VS II <0.01 VS I |
| IV | 5.23 ± 1.24 | <0.001 VS I |

TABLE 18

Effect of $(M_9G)_2$ on arterial cholesterol in quail after 8 weeks

Cholesterol (X ± SD, μmol/g wet weight)

| | Total | Free | Ester |
|---|---|---|---|
| I | 7.18 ± 1.36 | 5.37 ± 1.36 | 1.89 ± 0.77 |
| II | 18.61 ± 4.20~~~ | 8.10 ± 1.61~~ | 10.60 ± 3.28~~~ |
| III | 14.31 ± 0.24~~~* | 7.90 ± 2.28^ | 6.41 ± 1.28~~~** |
| IV | 14.01 ± 3.20~~~* | 7.31 ± 1.89^ | 6.70 ± 1.66~~~** | n = 7; ^P<0.05; ~~P<0.01, ~~~P<0.001 VS I; *P<0.05; **P<0.01 VS II

TABLE 19

Effect of (M₉G)₂ on the atherogenic lesions in quail after 8 weeks

| | Grade | | | | | | Total | Mean Score | Incidence of |
|---|---|---|---|---|---|---|---|---|---|
| | 0 | 0.5 | 1 | 2 | 3 | 4 | Score | X ± SD | Plaques (%) |
| I | 7 | 5 | | | | | 2.5 | 0.21 ± 0.26 | 0.0 (0/12) |
| II | | | 1 | 3 | 4 | 3 | 4 | 24.5 | 2.04 ± 1.06^^^ | 91.67 (11/12) |
| III | | 9 | 2 | 1 | | | 8.5 | 0.71 ± 0.45^^^*** | 25.00 (3/12) |
| IV | | 7 | 4 | 1 | | | 9.5 | 0.79 ± 0.45^^^*** | 41.67 (5/12) | n = 12 ^^P<0.01, ^^^P<0.001 VS I; ***P<0.001 VS II

TABLE 20

Effect of (M₉G)₂ on Arterial EC/TC and FC/TC quail after 8 weeks (X ± SD, %)

| | EC/TC | FC/TC |
|---|---|---|
| I | 26.37 ± 8.66 | 74.61 ± 10.40 |
| II | 56.09 ± 7.51^^^ | 44.30 ± 6.86^^^ |
| III | 44.90 ± 8.10^^^ | 54.71 ± 8.31^^^*** |
| IV | 47.78 ± 5.99^^^ | 51.93 ± 5.63^^^*** |

EC: esterified cholesterol

TC: total cholesterol n = 12 ^^^P<0.01 VS I; ***P<0.05 V II

Since modifications will be apparent to those of skill in this art, it is intended that this invention be limited only by the scope of the appended claims.

I claim:

1. A compound represented by formula (I):

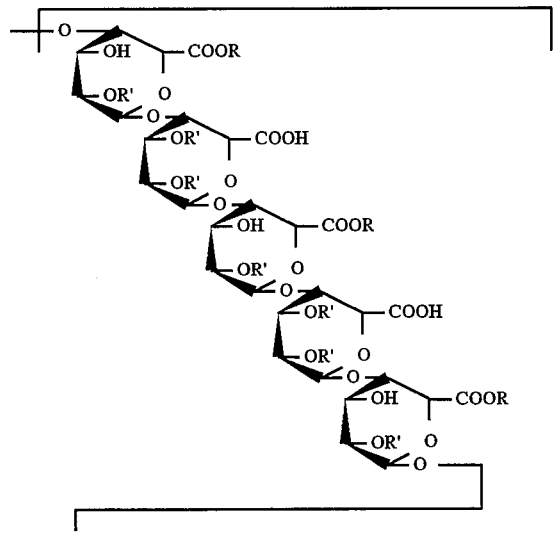

-continued

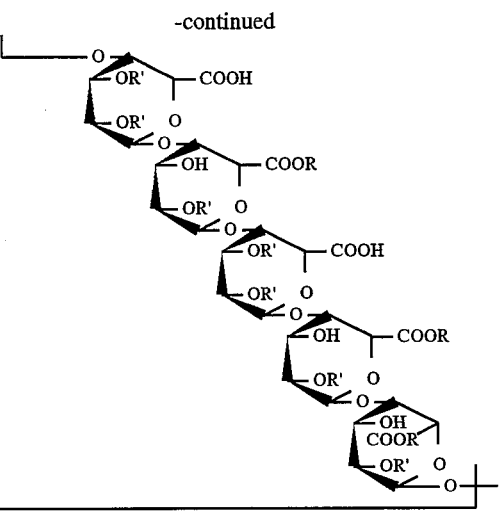

wherein:

R is —$(CH_2)_p CH(OH)(CH_2)_m(CH_3)$ or $CH_2(CH_2)_s OH$ in which p, m and s are independently 0 to 6;

R' is $SO_3Na$;

n is about 1 to about 3; and the resulting compound has a molecular weight less than about 5 kilodaltons.

2. A compound of claim 1, wherein R is selected from among —$CH_2CH(OH)CH_3$, —$CH_2CH_2OH$ and $CH_2OH$.

3. The compound of claim 2, wherein n is 2.

4. A compound of claim 2, wherein R is —$CH_2CH(OH)CH_3$.

5. A compound of claim 1, wherein R is —$CH_2CH(OH)CH_3$.

6. The compound of claim 3, wherein R is —$CH_2CH(OH)CH_3$.

7. An oligosaccharide produced by a process, comprising:

a) extracting polysaccharides from a marine brown algae by swelling the algae that has been previously dried in water;

b) acid hydrolyzing the mixture of polysaccharides to produce oligosaccharides having molecular weights of 5 kD or less;

c) esterifying the oligosaccharides by reacting the oligosaccharide with an epoxide, methanol, ethanol, or propanol, whereby about 50% of the acid residues on the constituent residues are esterified;

d) sulfating the resulting esterified oligosaccharide, whereby substantially all of the 2-positions on the constituent residues are sulfated, and about 40–50% of the 3-positions on these residues are sulfated, wherein the resulting preparation contains a substantially homogeneous preparation of oligosaccharides.

8. The oligosaccharide of claim 7, wherein steps a) and b) of the process comprise:
   i) soaking dried brown algae in water;
   ii) acidifying the mixture and refluxing at a temperature of about 100° C. for about 8–12 hours;
   iii) removing the solution and diluting the resulting solid in water to produce a gel and adjusting the pH from about 2.5 to about 3.0; and
   iv) centrifuging the resulting mixture, and collecting and desalting the supernatant;
   v) repeating steps i)–iv).

9. The oligosaccharide of claim 7, wherein step c) of the process comprises: reacting the product of step b) with an epoxide containing two or three carbons or with methanol.

10. The oligosaccharide of claim 7, wherein step d) of the process comprises: reacting the esterified product with chlorosulfonic acid.

11. A composition, comprising a compound of claim 1 and a pharmaceutically acceptable carrier.

12. The composition of claim 1 that is formulated for intravenous administration.

13. The composition of claim 1 that is formulated for local administration.

14. The composition of claim 1 that is formulated for oral administration.

15. The composition of claim 1 that is formulated for topical administration.

16. A composition, comprising an effective amount of a compound of claim 1 for treatment of ischemic or thrombotic vascular diseases of the central nervous system (CNS) and heart, wherein the composition is formulated for single dosage administration.

17. A method for treating ischemic vascular disease of the brain, comprising administering an effective amount of a compound of claim 1.

18. A method for treating pulmonary or deep vein thrombosis, comprising administering an effective amount of a compound of claim 1.

19. A method for treating myocardial infarction, comprising administering an effective amount of a compound of claim 1.

20. A method for treating hyperlipoproteinemia, comprising administering an effective amount of a compound of claim 1.

21. The method of claim 20, wherein the compound is administered intravenously or parenterally.

22. A method for lowering cholesterol, comprising administering an effective amount of a compound of claim 1.

23. The method of claim 22, wherein the compound is administered by mixing it with food.

24. A method for reducing the immunosuppressive side-effects associated with the administration of alkylating agents, comprising administering a immunostimulating amount of a compound of claim 1, simultaneously with, prior to or subsequent to administration of the alkylating agent.

25. A method of preventing atherosclerotic lesions, comprising administering an effective amount of a compound of claim 1 to a patient at risk for developing such lesions.

26. A method of treating coronary ischemia-induced angina, comprising administering an effective amount of a compound of claim 1 to patient experiencing a stroke or myocardial infarction or other acute thrombotic disorder.

27. A composition, comprising the oligosaccharide of claim 1, obtained by a process, comprising:
   a) extracting polysaccharides from a marine brown algae by swelling the algae that has been previously dried in water;
   b) acid hydrolyzing the mixture of polysaccharides to produce oligosaccharides having molecular weights of 5 kD or less;
   c) esterifying the oligosaccharides by reacting the oligosaccharide with an epoxide, methanol, ethanol, or propanol, whereby about 50% of the acid residues on the constituent residues are esterified;
   d) sulfating the resulting esterified oligosaccharide, whereby substantially all of the 2-positions on the constituent residues are sulfated, and about 40–50% of the 3-positions on these residues are sulfated, wherein the resulting preparation contains a substantially homogeneous preparation of oligosaccharides.

* * * * *

UNITED STATES PATENT AND TRADEMARK OFFICE

CERTIFICATE OF CORRECTION

PATENT NO.: 5,646,130    Page 1 of 2

DATED: July 8, 1997

INVENTOR(S): SHI, Guan Hua

It is certified that error appears in the above-identified patent and that said Letters Patent is hereby corrected as shown below:

at column 2, line 5, "There is" should read —Thus—;
at column 2, line 12, "glycosaminoclycans" should read —glycosaminoglycans—;
at column 3, line 4, "spectocopy" should read —spectroscopy—;
at column 3, line 12, insert —.— between "7-13%" and "Following";
at column 5, line 23, insert —or— between "attack," and "acute";
at column 7, line 7, "compounds" should read —compound—;
at column 7, line 66, "epoxide" should read —oxirane—;
at column 7, line 67, "methanol" should read —formaldehyde—;
at column 8, line 38, "rain" should read —min—;
at column 9, line 6, "orally" should read —oral—;
at column 12, line 45, "Of" should read —of—;
at column 12, line 47, insert —N— between "4" and "HCl";
at column 12, line 47, "is" should read —was—;
at column 15, line 52, "level" should read —levels—;
at column 16, line 40, in Table 3, "$t_{+e,fra\ 1/2}+ee\ Ka$" should read —$t_{1/2}\ Ka$—;
at column 16, line 41, in Table 3, "$t_{+e,fra\ 1/2}+ee\ \alpha$" should read —$t_{1/2}\ \alpha$—;
at column 16, line 42, in Table 3, "$t_{+e,fra\ 1/2}+ee\ \beta$" should read —$t_{1/2}\ \beta$—;
at column 16, line 54, "$t_{+e,fra\ 1/2}+ee\ \alpha$" should read —$t_{1/2}\ \alpha$—;
at column 16, line 55, "$t_{+e,fra\ 1/2}+ee\ \beta$" should read —$t_{1/2}\ \beta$—;
at column 17, line 50, insert —the— between "hrs," and "kidney"; and
at column 20, line 8, in Table 8, insert —%— after "inhibition".

Delete claims 9 and 27 and replace with the following claims:

9. The oligosaccharide of claim 7, wherein step c) of the process comprises: reacting the product of step b) with an epoxide containing two or three carbons or with formaldehyde.

UNITED STATES PATENT AND TRADEMARK OFFICE
CERTIFICATE OF CORRECTION

PATENT NO.: 5,646,130

DATED: July 8, 1997

INVENTOR(S): SHI, Guan Hua

It is certified that error appears in the above-identified patent and that said Letters Patent is hereby corrected as shown below:

27. A composition, comprising the oligosaccharide of claim 1, the composition obtained by a process, comprising:

a) extracting polysaccharides from a marine brown algae by swelling the algae that has been previously dried in water;

b) acid hydrolyzing the mixture of polysaccharides to produce oligosaccharides having molecular weights of 5 kD or less;

c) esterifying the oligosaccharides by reacting the oligosaccharide with an epoxide or formaldehyde, whereby about 50% of the acid residues on the constituent residues are esterified; and d) sulfating the resulting esterified oligosaccharide, whereby substantially all of the 2-positions on the constituent residues are sulfated, and about 40-50% of the 3-positions on these residues are sulfated, wherein the resulting preparation contains a substantially homogeneous preparation of oligosaccharides.

Signed and Sealed this

Twenty-fourth Day of February, 1998

*Attest:*

BRUCE LEHMAN

*Attesting Officer*   *Commissioner of Patents and Trademarks*